United States Patent [19]

Weyer et al.

[11] 3,928,610
[45] Dec. 23, 1975

[54] BENZENE SULFONYL-UREA PREPARATION FOR TREATMENT OF DIABETES MELLITUS AND A METHOD FOR TREATMENT

[75] Inventors: Rudy Weyer, Frankfurt am Main; Walter Aumuller, Kelkheim, Taunus; Helmut Weber, Frankfurt am Main; Roland Schweitzer, Falkenstein, Taunus; Ruth Heerdt, Mannheim, all of Germany

[73] Assignee: Hoechst Aktiengesellschaft, Frankfurt am Main, Germany

[22] Filed: Jan. 18, 1973

[21] Appl. No.: 324,834

Related U.S. Application Data

[62] Division of Ser. No. 149,745, June 3, 1971, Pat. No. 3,751,418.

[30] Foreign Application Priority Data

June 6, 1970 Germany............................ 2627950

[52] U.S. Cl. .............................................. 424/258
[51] Int. Cl............................................. A61k 27/00
[58] Field of Search ..................................... 424/258

[56] References Cited
UNITED STATES PATENTS
3,655,756  4/1972  Weber et al. ................... 260/287 R OTHER PUBLICATIONS
Arzneim—Forsch. 1971, 21(z) pp. 204–208, (Ambvogi et al.).

Primary Examiner—Jerome D. Goldberg
Attorney, Agent, or Firm—Curtis, Morris & Safford

[57] ABSTRACT

Hypoglycemically active benzenesulfonyl-ureas of the formula

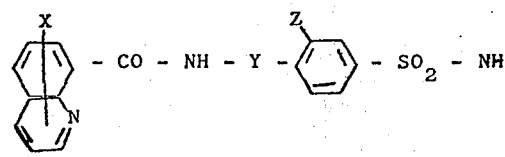

− CO − NH − R wherein X is hydrogen, chlorine, bromine, methoxy or methyl, Y is —CH(CH$_3$)—CH$_2$, —CH$_2$—CH(CH$_3$)— or —CH$_2$CH$_2$—, R is alkyl of 3 to 6 carbon atoms, cycloalkyl of 5 to 8 carbon atoms, which may be substituted by 1 or 2 alkyl of up to 3 carbon atoms or by chlorine, cycloalkenyl of 5 to 8 carbon atoms, which may be substituted by 1 to 2 alkyl of up to 3 carbon atoms, bicycloalkyl or bicycloalkenyl of 7 or 8 carbon atoms, nortricyclyl, spiro[2,4]-heptyl, Z is hydrogen or a hydrocarbon radical of 1 or 2 carbon atoms which forms with Y a 5- or 6-membered ring, or the salts thereof as a component in a pharmaceutical preparation for oral administration and lowering of the blood sugar level in the treatment of diabetes mellitus and a process for lowering the blood sugar level.

3 Claims, No Drawings

BENZENE SULFONYL-UREA PREPARATION FOR TREATMENT OF DIABETES MELLITUS AND A METHOD FOR TREATMENT

This is a division of application Ser. No. 149,745 filed June 3, 1971 now U.S. Pat. No. 3,751,418.

The present invention provides benzenesulfonyl-ureas of the formula

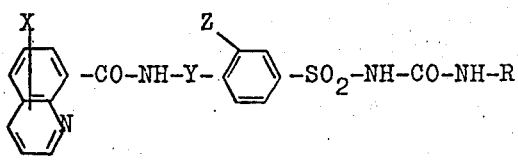

in which

X represents hydrogen, chlorine, bromine, methoxy or methyl,

Y represents —CH(CH₃)—CH₂—, —CH₂—CH(CH₃)—or, preferably, —CH₂—CH₂—,

R represents
  a. alkyl having 3 to 6 carbon atoms,
  b. cycloalkyl having 5 to 8 carbon atoms, which may be optionally substituted by 1 or 2 alkyl groups of up to 3 carbon atoms in total, or by chlorine,
  c. cycloalkenyl having 5 to 8 carbon atoms, which may optionally be substituted by 1 or 2 alkyl groups of up to 3 carbon atoms in total,
  d. bicycloalkyl or bicycloalkenyl having 7 or 8 carbon atoms,
  e. nortricyclyl,
  f. spiro[2,4]-heptyl, Z represents hydrogen or a hydrocarbon radical of 1 or 2 carbon atoms which forms with Y a 5- or 6-membered ring.

According to the above definitions R may, for example, stand for 3-ethylcyclopentyl, methyl-cyclopentyl, dimethyl-cyclopentyl, 4-methyl-cyclohexyl, 4-propyl-cyclohexyl, cyclopentenyl, cyclohexenyl, cycloheptenyl, 4-chloro-cyclohexyl, 4,4-dimethylcyclohexyl, 3-methyl-cyclopentenyl, 4-methyl-cyclohexenyl, endoalkylene-cyclohexyl, endoalkylene-cyclohexyenyl, bicyclo (2.2.1) hept-2-en-7-yl, 2,6-endomethylene-cycloheptyl, 4,4-dimethyl-cyclohexen-2-yl, 2-chlorocyclopentyl, 7-norcananyl or spiro [2,4]-heptyl.

The compounds of the above formula have, in substance or in the form of their salts, a hypoglycemic action which is strong and long lasting.

The present invention also provides a process for the manufacture of these benzenesulfonyl-ureas, which comprises
  a. reacting benzenesulfonyl-isocyanates, benzenesulfonylcarbamic acid esters, benzenesulfonyl-thiolcarbamic acid esters, benzenesulfonyl-ureas, benzenesulfonylsemicarbazides or benzenesulfonylsemicarbazones which are substituted in 4-position by the group

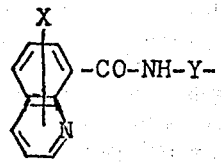

with an amine R—NH₂ or salts thereof, or reacting sulfonamides of the formula

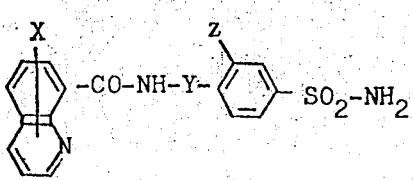

or salts thereof with R-substituted isocyanates, carbamic acid esters, thiolcarbamic acid esters, carbamic acid halides or ureas;

b. saponifying or hydrolyzing correspondingly substituted benzenesulfonyl-isourea ethers, benzenesulfonyl-isourea esters, benzenesulfonyl-isothiourea ethers, benzenesulfonyl-parabanic acids or benzenesulfonyl-haloformic acid amidines or compounds of the formula

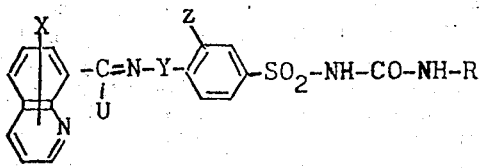

wherein U stands for oxygen-lower-alkyl, sulfur-lower alkyl or halogen (preferably chlorine);
  c. replacing in correspondingly substituted benzenesulfonylthio-ureas or thioamido-alkyl-benzenesulfonyl-ureas or thio-ureas, the sulfur atom or sulfur atoms of the thiourea and/or thio-amido groups by an oxygen atom or oxygen atoms, or adding water to correspondingly substituted carbodiimides;
  d. oxidizing correspondingly substituted benzenesulfinylureas or benzenesulfenyl-ureas;
  e. introducing the group

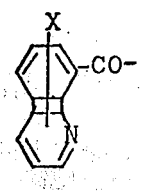

by acylation, optionally in one or more steps, into benzenesulfonyl-ureas of the formula

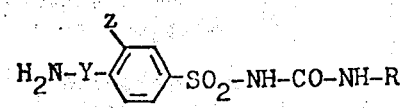

f. reacting correspondingly substituted benzenesulfonylhalides with R-substituted ureas or alkali metal salts thereof; or reacting correspondingly substituted benzenesulfinic acid halides or, in the presence of acid condensation agents, even correspondingly substituted sulfinic acids or alkali metal salts thereof with N—R—N'-hydroxyurea;

and, where required, treating the reaction product so obtained with alkaline agents for salt formation.

The aforesaid benzenesulfonyl-carbamic acid esters or benzene-sulfonyl-thiolcarbamic acid esters may have in the alcoholic component an alkyl group or an aryl group or even a heterocyclic radical. Since this radical is split off during the reaction, its chemical constitution has no influence on the nature of the final product and may, therefore, be varied within wide limits. The same applies to N—R-substituted carbamic acid esters and the corresponding thiolcarbamic acid esters.

As carbamic acid halides, the chlorides are preferably used.

The benzenesulfonyl-ureas used as starting materials in the process of the present invention may be unsubstituted at the nitrogen atom of the urea molecule not joined to the sulfonyl group or may be mono- or especially di-substituted. Since these substituents are split off during the reaction with the amines, their nature can be varied within wide limits. In addition to benzenesulfonyl-ureas which carry alkyl, aryl, acyl or heterocyclic substituents, there may also be used benzenesulfonyl-carbamoyl-imidazoles and similar compounds or bis-(benzenesulfonyl)-ureas which may carry at one of the nitrogen atoms a further substituent, for example, a methyl group. For example, such bis-(benzenesulphonyl)-ureas or N-benzenesulfonyl-N'-acyl-ureas may be treated with R-substituted amines and the salts so obtained may be heated to elevated temperatures, especially to a temperature above 100°C.

Furthermore, it is possible to start from R-substituted ureas or from R-substituted ureas which are mono- or especially di-substituted at the free nitrogen atom and to react them with benzene-2-sulfonamides carrying the substituent

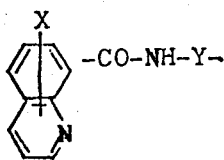

in 4-position. As such starting materials, there may be used for example N-cyclohexyl-urea, the corresponding N'-acetyl, N'-nitro, N'-cyclohexyl, N', N'-diphenyl (in which case the two phenyl radicals may also be substituted or be linked with each other either directly or by means of a bridge member such, for example, as —CH$_2$—, —NH—, —O— or —S—), N'-methyl-N'-phenyl, N',N'-dicyclohexyl-ureas as well as cyclohexyl-carbamoyl-imidazoles, -pyrazoles or -triazoles as well as compounds which carry, instead of cyclohexyl, another substituent within the range of the above definition for R.

The hydrolysis of the benzenesulfonyl-parabanic acids, benzenesulfonyl-isourea ethers, benzenesulfonyl-isothiourea ethers, benzenesulfonyl-isourea esters or benzensulfonylhaloformic acid amidines mentioned as starting substances is suitably carried out in an alkaline medium. Isourea ethers and isourea esters may also be hydrolysed successfully in an acid medium.

The replacement of the sulfur atom in the urea grouping of the correspondingly substituted benzenesulfonyl-thioureas by an oxygen atom can be effected in known manner, for example, with the aid of oxides or salts of heavy metals or with the use of oxidizing agents such, for example, as hydrogen peroxide, sodium peroxide, nitrous acid or permanganates.

The thioureas may also be desulfurized by treatment with phosgene or phosphorus pentachloride. The chloroformic acid amidines or carbodiimides obtained as intermediates may be converted into the benzenesulfonyl-ureas by suitable measures such, for example, as by saponification or addition of water.

As regards the reaction conditions, the variations of carrying out the process of the invention may, in general, be modified within wide limits and can be adapted to each individual case. For example, the reactions may be carried out with the use of solvents or without solvents, at room temperature or at an elevated temperature.

Depending on the nature of the starting substances, one or other of the aforesaid methods may, in some cases, provide a desired individual benzenesulfonyl-urea only in a small yield or may be inappropriate for its synthesis. In such comparatively rare cases, the expert will have no difficulty in synthesizing the desired product according to one of the other methods of the process described.

The hypoglycemic action of the benzenesulfonyl-ureas of the invention can be ascertained by administering them to normally fed rabbits in the form of the sodium salts in a dose of 10 mg/kg of body weight and determining the blood sugar level according to the known method of Hagedorn-Jensen or by means of an auto-analyzer for a prolonged period of time.

TABLE

Lowering of the blood sugar level of rabbits, in %, after oral administration of 10 mg/kg of N-[β-6-chloro-quinolino-8-carboxamido-ethyl)-benzenesulfonyl]-N'-cyclohexyl-urea

| after | 1 | 3 | 6 | 24 | 48 | 72 | 96 | hours |
|---|---|---|---|---|---|---|---|---|
|  | 24 | 23 | 20 | 36 | 31 | 22 | 0 |  |

The benzenesulfonyl-ureas of the present invention are preferably used for the manufacture of pharmaceutical preparations suitable for oral administration and for the lowering of the blood sugar level in the treatment of diabetes mellitus, and may be used as such or in the form of their physiologically tolerable salts or in the presence of substances which cause such salt formation. For the formation of salts, there may be used, for example, alkaline agents such as alkali metal- or alkaline earth metal hydroxides and alkali metal or alkaline earth metal carbonates or bicarbonates.

The pharmaceutical preparations of the invention are preferably made up in the form of tablets, and as pharmaceutically suitable carriers there may be mentioned, for example, talc, starch, lactose, tragacanth and magnesium stearate.

A pharmaceutical preparation, for example, a tablet or a powder, containing the benzenesulfonyl-ureas of the invention as the active substance, with or without the aforementioned carriers, is advantageously brought into a suitable dosage unit form. The dose chosen should comply with the activity of the benzenesulfonyl-urea used and with the desired effect. Advantageously, the dosage per unit amounts to about 0.5 to 100 mg, preferably 2 to 10 mg, but considerably higher or lower dosage units may also be used, which, when required, are divided or multiplied prior to their administration. The following Examples illustrate the invention:

EXAMPLE 1

N-[4-(β-quinolino-8-carboxamido-ethyl)-benzenesulfonyl]-N'-cyclohexy-urea 8.9 g of 4-(β-quinolino-8-carboxamido-ethyl)-benzenesulfonamide (m.p. 210°–212°C, prepared from 4-(β-aminoethylbenzene-sulfonamide and the mixed anhydride obtained from quinolino-8-carboxylic acid, triethylamine and chloroformic acid methyl ester) were refluxed while stirring in 150 ml of acetone with 5 g of potassium carbonate. After addition of 3.1 g of cyclohexyl-isocyanate, the whole was refluxed for 3 hours while stirring, the acetone was evaporated, the residue was treated with water and filtered. The filtrate was weakly acidified with dilute acetic acid, the precipitate was suction-filtered and recrystallized from water-ethanol. The N-[4-(β-quinolino-8-carbox-amido-ethyl)-benzenesulfonyl]-N'-cyclohexyl-urea obtained had a melting point of 184°–185°C.

In an analogous manner there were obtained: N-[4-(β-quinolino-8-carboxamidoethyl)-benzenesulfonyl]-N'-(4-methyl-cyclohexyl)-urea, m.p. 206°–208°C (from ethanol), N-[4-(β-quinolino-8-carboxamidoethyl)-benzenesulfonyl]-N'-isobutyl-urea, m.p. 170°–172°C (from water-ethanol), N-[4-(β-quinolino-8-carboxamidoethyl)-benzenesulfonyl]-N'-(Δ3-cyclohexenyl)-urea, m.p. 200°–202°C (from water-ethanol), N-[4-(β-quinolino-8-carboxamidoethyl)-benzenesulfonyl]-N'-(4-ethyl-cyclohexyl)-urea, m.p. 192°–194°C (from water-ethanol), N-[4-(β-quinolino-8-carboxamidoethyl)-benzenesulfonyl]-N'-(4-methyl-Δ3-cyclohexenyl)-urea, m.p. 171°C (from water-ethanol);

N-[4-(β-quinolino-8-carboxamidoethyl)-benzenesulfonyl]-N'-(2,5-endomethylene-Δ3-cyclohexenyl)-urea, m.p. 195°–197°C (from water-ethanol).

In an analogous manner there were obtained from 4-(β-2-methyl-quinolino-8-carboxamidoethyl)-benzenesulfonamide, m.p. 199°–202°C:

N-[4-(β-2-methyl-quinolino-8-carboxamidoethyl)-benzenesulfonyl]-N'-cyclohexyl-urea, m.p. 168°–171°C (from waterethanol), N-[4-(β-2-methyl-quinolino-8-carboxamidoethyl)-benzensulfonyl]-
N'-(4-methyl-cyclohexyl)-urea, m.p. 199°–201°C (from ethanol-water).

In an analogous manner there were obtained from 4-(β-6-chloro-quinolino-8-carboxamidoethyl)-benzenesulfonamide, m.p. 230°–232°C:

N-[4-(β-6-chloro-quinolino-8-carboxamidoethyl)-benzenesulfonyl]-N'-cyclohexyl-urea, m.p. 197°–199°C, N-[4-(β-6-chloro-quinolino-8-carboxamidoethyl)-benzenesulfonyl]-N'-(4-methyl-cyclohexyl)-urea + 1 C₂H₅OH, m.p. 124°–127°C (from ethanol-DMF), N-[4-(β-6-chloro-quinolino-8-carboxamidoethyl)-benzenesulfonyl]-N'-n-butyl-urea, m.p. 151°–153°C (from ethanol-DMF), N-[4-(β-6-chloro-quinolino-8-carboxamidoethyl)-benzenesulfonyl]-N'-(Δ3-cyclohexenyl)-urea, m.p. 214°–216°C (from ethanol-DMF).

In an analogous manner there were obtained from 4-(β-6-bromo-quinolino-8-carboxamidoethyl)-benzenesulfonamide, m.p. 221°–222°C:

N-[4-(β-6-bromo-quinolino-8-carboxamidoethyl)-benzenesulfonyl]-N'-cyclohexyl-urea, m.p. 187.5°–188.5°C (from water-ethanol), N-[4-(β-6-bromo-quinolino-8-carboxamidoethyl)-benzenesulfonyl]-
N'-(Δ3-cyclohexenyl)-urea, m.p. 201°–203°C. (from ethanol-DMF), N-[4-(β-6-bromo-quinolino-8-carboxamidoethyl)-benzenesulfonyl]-
N'-(4-methylcyclohexyl)-urea, m.p. 123°–125°C. (from ethanol).

In an analogous manner there were obtained from 4-(β-6-chloro-quinolino-8-carboxamidopropyl)-benzenesulfonamide, m.p. 215°–217°C:

N-[4-(β-6-chloro-quinolino-8-carboxamido-propyl)-benzenesulfonyl]-N'-cyclohexyl-urea, m.p. 197°–199°C.

In an analogous manner there were obtained:

N-[4-(β-6-chloro-quinolino-8-carboxamidoethyl)-benzenesulfonyl]-N'-(2,5-endomethylene-Δ3-cyclohexenyl)-urea, m.p. 190°–192°C (from ethanol), N-[4-(β-6-chloro-quinolino-8-carboxamidoethyl)-benzenesulfonyl]-N'-(4-ethylcyclohexyl)-urea, m.p. 166°–168°C (from ethanol), N-[4-(β-6-chloro-quinolino-8-carboxamidoethyl)-benzenesulfonyl]-N'-(4-chlorocyclohexyl)-urea, m.p. 192°–194°C (from ethanol);

from 4-(β-5-methoxyquinolino-8-carboxamidoethyl)-benzenesulfonamide, m.p. 201°–202°C:

N-[4-(β-5-methoxyquinolino-8-carboxamidoethyl)-benzenesulfonyl]-N'-cyclohexyl-urea, m.p. 191°–193°C (from ethanol);

from 4-(α-methyl-β-6-chloro-quinolino-8-carboxamidoethyl)-benzenesulfonamide, m.p. 202°–204°C:

N-[4-(α-methyl-β-6-chloroquinolino-8-carboxamidoethyl)-benzenesulfonyl]-N'-cyclohexyl-urea, m.p. 198°–200°C (from ethanol-DMF);

In an analogous manner there was obtained from 2-(6-chloro-quinolino-8-carboxamido)-indan-5-sulfonamide (m.p. 286°–287.5°C):

N-[2-(6-chloro-quinolino-8-carboxamido)-indan-5-sulfonyl]-N'-cyclohexyl-urea, m.p. 201°–202°C, (from ethanol/dimethylformamide).

EXAMPLE 2

N-[4-(β-quinolino-8-carboxamido-ethyl)-benzenesulfonyl]-N'-cyclopentyl-urea 8.3 g of 4-(β-quinolino-8-carboxamido-ethyl)-benzenesulfonyl-urethane (m.p. 207°–209°C, prepared from 4-(β-quinolino-8-carboxamido-ethyl)-benzenesulfonamide and chloroformic acid methyl ester in acetone in the presence of potassium carbonate) were heated for 1 hour to a slight boil at a descending condenser in 100 ml of dioxan with 1.7 g of cyclopentylamine. Subsequently, dioxan was entirely evaporated under reduced pressure and the residue was recrystallized from water-ethanol. The N-[4-(β-quinolino-8-carboxamido-ethyl)-benzenesulfonyl]-N'-cyclopentyl-urea obtained had a melting point of 188°–190°C.

In an analogous manner there were obtained N-[4-(β-quinolino-8-carboxamidoethyl)-benzenesulfonyl]-N'-cycloheptylurea, m.p. 196°–198°C (from water-ethanol), N-[4-(β-quinolino-8-carboxamidoethyl)-benzenesulfonyl]-N'-4,4-dimethylcyclohexyl)-urea, m.p. 203°–205°C (from ethanol-DMF), N-[4-(β-quinolino-8-carboxamidoethyl)-benzenesulfonyl]-N'-n-propyl-urea, m.p. 180°–182°C (from ethanol-DMF), N-[4-(β-quinolino-8-carboxamidoethyl)-benzenesulfonyl]-N'-n-hexyl-urea, m.p. 134°–136°C (from ethanol).

In an analogous manner there were obtained N-[4-(β-quinolino-8-carboxamidoethyl)-benzenesulfonyl]-N'-cyclooctyl-urea, m.p. 208°–210°C (from ethanol), N-[4-(β-quinolino-8-carboxamidoethyl)-benzenesulfonyl]-N'-(3-methyl-cyclopenten-(2)-yl)-urea, m.p. 191°–193°C (from ethanol-DMF), from
4-(β-6-chloro-quinolino-8-carboxamidoethyl)-benzenesulfonylcarboxamido-methyl ester (m.p. 199°–201°C, prepared from 4-(β-6-chloro-quinolino-8-carboxamidoethyl)-benzenesulfonamide and chloroformic acid methyl ester):

N-[4-(β-6-chloro-quinolino-8-carboxamidoethyl)-benzenesulfonyl]-N'-cyclopentyl-urea, m.p. 204°–206°C (from ethanol-DMF), N-[4-(β-6-chloro-quinolino-8-carboxamidoethyl)-benzenesulfonyl]-N'-cycloheptyl-urea, m.p. 199°–201°C (from ethanol-DMF), N-[4-(β-6-chloro-quinolino-8-carboxamidoethyl)-benzenesulfonyl]-N'-(4-isopropylcyclohexyl)-urea, m.p. 171°–173°C (from ethanol), N-[4-(β-6-chloro-quinolino-8-carboxamidoethyl)-benzenesulfonyl]-N'-nortricyclyl-urea, m.p. 195°–197°C (from ethanol), N-[4-(β-6-chloro-quinolino-8-carboxamidoethyl)-benzenesulfonyl]-N'-(3-ethyl-cyclopentyl)-urea, m.p. 156°–158°C (from ethanol), N-[4-(β-6-chloro-quinolino-8-carboxamidoethyl)-benzenesulfonyl]-N'-(cyclopenten-(2)-yl)-urea, m.p. 199°–200°C (from ethanol-DMF), N-[4-(β-6-chloro-quinolino-8-carboxamidoethyl)-benzenesulfonyl]-N'-(cyclohepten-(2)-yl)-urea, m.p. 208°–210°C (from methanol-DMF), N-[4-(β-6-chloro-quinolino-8-carboxamidoethyl)-benzenesulfonyl]-N'-(3,3-dimethyl-cyclopentyl)-urea, m.p. 152°–155°C (from methanol).

EXAMPLE 3

N-[4-(β-quinolino-8-carboxamido-ethyl)-benzenesulfonyl]-N'-cyclohexyl-urea

A mixture of 28.56 g of 4-(β-quinolino-8-carboxamidoethyl)-benzenesulfonamide, 22.1 g of potassium carbonate and 300 ml of acetone was refluxed while stirring for 6 hours. Subsequently, 11.3 g of cyclohexyl-isothiocyanate were added dropwise, and stirring was continued for 8 hours at boiling temperature. The precipitate was suction-filtered, introduced into dilute hydrochloric acid and the N-[4-(β-quinolino-8-carboxamido-ethyl)-benzenesulfonyl]-N'-cyclohexyl-thiourea obtained was recrystallized from methanol and dioxan. M.p. 183°–184°C.

2g of N-[4-(β-quinolino-8-carboxamido-ethyl)-benzenesulfonyl]-N'-cyclohexyl-thiourea were dissolved in 25 ml of 1N sodium hydroxide solution and 25 ml of dioxan. Subsequently, 3 ml of 30% hydrogen peroxide were added and the whole was heated on a steam bath for 15 minutes. The mixture was diluted with water, filtered and acidified with dilute hydrochloric acid. The precipitate was suction-filtered and reprecipitated twice from dilute ammonia and dilute hydrochloric acid. The product was isolated and the N-[4-(β-quinolino-8-carboxamido-ethyl)-benzenesulfonyl]-N'-cyclohexyl-urea obtained was recrystallized from methanol; m.p. 186°–187°C.

EXAMPLE 4

N-[4-(β-quinolino-8-carboxamido-ethyl)-benzenesulfonyl]-N'-cyclohexyl-urea 4.96 g of N-[4-(β-quinolino-8-carboxamido-ethyl)-benzenesulfonyl]-N'-cyclohexyl-thiourea were dissolved in 250 ml of methanol and 40 ml of dioxan. Subsequently, 2.16 g of HgO were added and the whole was heated to the boil for 4 hours while stirring. The mixture was then concentrated and the N-[4-(β-quinolino-8-carboxamido-ethyl)-benzenesulfonyl]-N'-cyclohexyl-isourea methyl ether obtained was recrystallized from methanol. M.p. 138°–140°C.

1 G of isourea methyl ether, 30 ml of dioxan and 30 ml of 1N sodium hydroxide solution were heated for 1 hour on a steam bath. Subsequently, the mixture was concentrated, stirred with dilute hydrochloric acid and reprecipitated twice from dilute ammonia and dilute hydrochloric acid. The N-[4-(β-quinolino-8-carboxamido-ethyl)-benzenesulfonyl]-N'-cyclohexyl-urea obtained was recrystallized from methanol; m.p. 184°–187°C.

EXAMPLE 5

N-[4-(β-quinolino-8-carboxamido-ethyl)-benzenesulfonyl]-N'-cyclohexyl-urea

A solution of 4.96 g of N-[4-(β-quinolino-8-carboxamido-ethyl)-benzenesulfonyl]-N'-cyclohexyl-thiourea in 75 ml of dioxan was introduced into an excess solution of diazomethane and ether and the whole was allowed to stand overnight. Subsequently, the solution was concentrated and treated with ether. The N-[-(β-quinolino-8-carboxamido-ethyl)-benzenesulfonyl]-N'-cyclohexyl-isothiourea methyl ether obtained had a melting point of 121°–124°C.

1 g of N-[4-(β-quinolino-8-carboxamido-ethyl)-benzenesulfonyl]-N'-cyclohexyl-isothiourea methyl ether, 15 ml of dioxan and 30 ml of 1N sodium hydroxide solution were heated for 1 hour on a steam bath. Subsequently, the solution was concentrated, stirred with dilute hydrochloric acid and reprecipitated twice from dilute ammonia and dilute hydrochloric acid. The N-[4-(β-quinolino-8-carboxamido-ethyl)-benzenesulfonyl]-N'-cyclohexyl-urea obtained was recrystallized from methanol and had a melting point of 185°– 187°C.

We claim:
1. A pharmaceutical preparation for oral administeration and lowering the blood sugar level in the treatment of diabetes mellitus, which comprise about 0.5 to 100 mg per unit dose of a benzenesulfonylurea of the formula

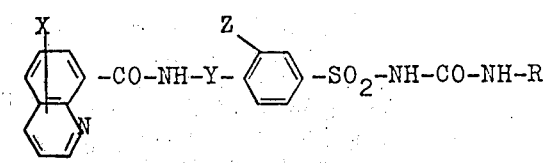

in which:
X represents a hydrogen, chlorine or bromine atom, a methoxy or methyl group, Y represents —CH(CH₃)—CH₂—, —CH₂—CH(CH₃)— or —CH₂—CH₂—, R is
a. alkyl having 3 to 6 carbon atoms
b. cycloalkyl having 5 to 8 ring carbon atoms, which is optionally substituted by 1 or 2 alkyl groups of up to 3 carbon atoms in total or by a chlorine atom,
c. cycloalkenyl having 5 to 8 ring carbon atoms, which is optionally substituted by 1 or 2 alkyl groups of up to 3 carbon atoms in total,
d. bicycloalkyl or bicycloalkenyl having 7 or 8 carbon atoms selected from the group consisting of endoalkylenecyclohexyl, endoalkylenecyclohexenyl, bicyclo (2.2.1) hept-2ene-7-yl, 2,6-endomethylene cyclohepthyl, 7-norcananyl or spiro (2,4)-heptyl,
e. nortricyclyl,
f. spiro[2,4]-heptyl, Z is hydrogen or an alkylene radical having 1 or 2 carbon atoms, which forms with Y a 5- membered ring, and salts thereof of a pharmaceutically acceptable base and a pharmaceutically suitable carrier.

2. A pharmaceutical preparation according to claim 1 wherein the benzenesulfony-urea is N-[4-(β-6-chloroquinolino-8-carboxamidoethyl)-benzenesulfonyl]-N'-cyclohexyl-urea.

3. A process for lowering the blood sugar level in the treatment of diabetes mellitus, which comprises administering orally to the patent an effective amount in a unit dose form from about 0.5 to 100 mg of a benzenesulfonyl-urea as defined in claim 1.

* * * * *